US011231375B2

(12) United States Patent  
Yi et al.

(10) Patent No.: US 11,231,375 B2  
(45) Date of Patent: Jan. 25, 2022

(54) APPARATUS FOR HIGH-SPEED SURFACE RELIEF MEASUREMENT

(71) Applicant: Wisconsin Alumni Research Foundation, Madison, WI (US)

(72) Inventors: Soongyu Yi, Madison, WI (US); Zongfu Yu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/417,186

(22) Filed: May 20, 2019

(65) Prior Publication Data

US 2020/0371043 A1     Nov. 26, 2020

(51) Int. Cl.  
*G01N 21/88* (2006.01)  
*G01N 21/17* (2006.01)  
*G02B 27/00* (2006.01)  
*G01B 11/26* (2006.01)

(52) U.S. Cl.  
CPC ......... *G01N 21/8806* (2013.01); *G01N 21/17* (2013.01); *G02B 27/0087* (2013.01); *G01B 11/26* (2013.01); *G01N 2021/8841* (2013.01)

(58) Field of Classification Search  
CPC ............... G01N 21/8806; G01N 21/17; G01N 2021/8841; G02B 27/0087; G01B 11/26  
See application file for complete search history.

(56) References Cited

U.S. PATENT DOCUMENTS

| 3,971,956 A | 7/1976 | Jakeman et al. |
| 4,577,967 A * | 3/1986 | Fujita .................. G01B 11/303 356/489 |
| 2004/0263783 A1 | 12/2004 | Neal et al. |
| 2005/0018180 A1* | 1/2005 | Ayres ................. G01N 21/4788 356/237.1 |
| 2008/0123106 A1 | 5/2008 | Zeng et al. |
| 2009/0276188 A1* | 11/2009 | Cui ........................ G02B 21/14 702/189 |
| 2011/0311132 A1* | 12/2011 | Meimoun ................ G01J 9/00 382/162 |
| 2013/0229486 A1 | 9/2013 | Molnar et al. |
| 2016/0047710 A1* | 2/2016 | Maeda ............... G01M 11/0207 356/512 |
| 2017/0059446 A1 | 3/2017 | Maeda |
| 2019/0346311 A1* | 11/2019 | Yu ............................ G01J 9/00 |

FOREIGN PATENT DOCUMENTS

JP     2008233088 A     10/2008

OTHER PUBLICATIONS

Guoan Zheng "Angle-sensitive pixel design for wavefront sensing." arXiv preprint arXiv:1304.7339 (2013), California, US.  
International Search Report & Written Opinion for PCT US/2020/0030070 dated Jul. 29, 2020.

* cited by examiner

*Primary Examiner* — Deoram Persaud  
(74) *Attorney, Agent, or Firm* — Boyle Fredrickson, S.C.

(57) ABSTRACT

An apparatus for measurement of surface relief provides a phase sensitive camera and processing to reconstruct a wavefront profile matching the surface when illuminated with a known light source thereby providing noncontact surface relief measurements.

20 Claims, 5 Drawing Sheets

APPARATUS FOR HIGH-SPEED SURFACE RELIEF MEASUREMENT

STATEMENT REGARDING FEDERALLY SPONSORED RESEARCH OR DEVELOPMENT

This invention was made with government support under 1749050 awarded by the National Science Foundation. The government has certain rights in the invention.

CROSS REFERENCE TO RELATED APPLICATION

--

BACKGROUND OF THE INVENTION

The present invention relates to an apparatus for precise measurements of surface relief and in particular to a high-speed non-contact optical system for making such measurements.

Measurement of surface relief is an important part of metrology and used, for example, in inspecting machined surfaces for roughness, evaluating thickness of films, measuring surface wear, and the like. Many important applications where surface relief is measured require noncontact measurement either because the surface would be adversely affected by contact or because of small but deep grooves or steps that interfere with triangulation or physical probes.

Standard techniques for noncontact surface relief measurement use interferometry. Interferometric techniques detect the interference between two light beams to deduce surface height. Normally these techniques are relatively slow because they require a scanning light beam and/or a height-adjustable stage holding the surface to be analyzed that must be moved in a series of increments to generate a set of different interference measurements.

SUMMARY OF THE INVENTION

The present invention provides camera-type system that may make surface relief measurements of multiple points over area, simultaneously, without intervening mechanical movement of the stage or the like, permitting practical, high-speed measurements potentially at video frame rates. The camera includes a high-resolution wavefront sensor together with processing circuitry to extract a wavefront surface that mirrors the surface relief of the surface being measured. By eliminating mechanical scanning and stepping mechanisms, a low cost surface metrology instrument is also created.

More specifically, in one embodiment, the invention provides an apparatus for surface relief measurement having a light source for illuminating a surface to be measured along an illumination axis and a wavefront angle sensor comprising an array of sensor elements at multiple locations distributed in two dimensions over a sensor area, the wavefront angle sensor measuring wavefront angle at each sensor element with respect to an axis of the wavefront angle sensor, and the wavefront angle sensor positioned to receive light from the light source phase-shifted by the surface to be measured. An electronic computer provides a display and a processor executing a program to (a) collect wavefront angles from the sensor elements to compute a continuous surface consistent with the wavefront angles; and (b) output a relief map of the surface to be measured using the continuous surface, the relief map indicating heights of the surface to be measured along the illumination axis at multiple points distributed in two dimensions over the surface to be measured.

It is thus a feature of at least one embodiment of the invention to provide a rapid method of surface relief measurement that eliminates the complexity of mechanical scanning or mechanical stages of typical interferometry techniques.

The relief map may be any of a set of cross-sectional plots together describing a three-dimensional surface, a two-dimensional representation of a shaded three-dimensional surface, a planar diagram with iso-elevation lines, and an array of height values.

It is thus a feature of at least one embodiment of the invention to provide any of a variety of output display types comparable to those provided by interferometry.

The relief map provides a quantitative indication of surface heights.

It is thus a feature of at least one embodiment of the invention to provide quantitatively precise and repeatable surface relief measurements.

The sensor elements may be distributed over two dimensions of the sensor area at a spacing of less than 20 μm and there may be over 20,000 sensor elements.

It is thus a feature of at least one embodiment of the invention to provide camera quality surface relief measurements and images.

The wavefront angle sensor may further measure wavefront intensity at each sensor element and the relief map may provide an indication of light intensity at the multiple points.

It is thus a feature of at least one embodiment of the invention to measure other surface features such as changes in color or darkness, for example, to provide identifying fiducials or additional information about the surface.

The electronic computer may further execute the program to determine an azimuthal angle with respect to the illumination axis at multiple points on the surface to be measured, and the relief map may provide a shading synthesizing a shading of the relief of the surface to be measured as if illuminated from a particular azimuthal angle direction.

It is thus a feature of at least one embodiment of the invention to provide a synthesized shading of the output image offering visual clues qualitatively indicating the surface relief.

The electronic computer may further execute the program to determine a polar angle with respect to the illumination axis at multiple points on the surface to be measured, and the relief map may provide a shading synthesizing a shading of the surface as if illuminated from a diffuse light source.

It is thus a feature of at least one embodiment of the invention to provide a volumetric shading deduced from the surface relief providing an alternative qualitative understanding of the surface relief.

The electronic computer may correct the relief map according to a known shape of a wavefront of the light source by adjusting the continuous surface by the known shape of the wavefront of light.

It is thus a feature of at least one embodiment of the invention to allow illumination by both planar and spherical wavefronts (the latter, for example, from a point source) and by illumination that is canted with respect to the surface to be measured.

The apparatus may further include focusing optics receiving light from the surface to be measured, and the wavefront angle sensor may be positioned at the focal plane of the focusing optics.

It is thus a feature of at least one embodiment of the invention to provide a system that can work with intervening lenses for magnification.

The electronic computer may correct quantitative features of the relief map according to a magnification of the focusing optics.

It is thus a feature of at least one embodiment of the invention to allow the generation of magnified surface relief images while preserving quantitative accuracy.

The wavefront angle sensor may provide an array of light intensity sensing elements tiling the surface area to receive light having a wavefront angle with respect to a surface normal of the substrate and a set of shadow casters, each shadow caster associated with a group of at least three sensing elements to selectively shade different sensing elements of that group as a function of the wavefront angle. The electronic computer may operate to determine light intensity measured by different sensing elements in a group to provide an output signal indicating wavefront angle.

It is thus a feature of at least one embodiment of the invention to provide a high-resolution sensor system that can provide sufficiently detailed wavefront measurement needed for accurate surface relief measurement with useful fields of view.

The light sensing elements may be CMOS light detectors.

It is thus a feature of at least one embodiment of the invention to leverage highly developed imaging technology to produce an advanced surface relief camera.

The light source may be polychromatic light.

It is thus a feature of at least one embodiment of the invention to provide a measurement system that can work with ambient or white light or the like to provide natural light images.

The light source may be at least one light-emitting diode.

It is thus a feature of at least one embodiment of the invention to eliminate the need for coherent light sources.

The continuous surface may be formed by a curve fitting process fitting the wavefront angles to a continuous surface.

It is thus a feature of at least one embodiment of the invention to provide a robust method of connecting discrete wavefront measurements into a surface that is resistant to measurement noise and error.

The light source may be positioned on a first side of the surface to be measured and be adapted to transmit light to the first side of the surface to be measured which is reflected from the surface to be measured to the wavefront angle sensor, and the electronic computer may invert the continuous surface to provide the relief map.

It is thus a feature of at least one embodiment of the invention to provide a reflective surface relief measurement system that can work with opaque surfaces.

The apparatus may provide housing for supporting the light source, the wavefront angle detector, and the display, the housing providing a handle for support of the housing by a user relative to the surface to be measured to be positionable by the user by observing the image on the display.

It is thus a feature of at least one embodiment of the invention to provide a hand-held instrument of a type that would be difficult to implement with interference type designs.

These particular objects and advantages may apply to only some embodiments falling within the claims and thus do not define the scope of the invention.

DETAILED DESCRIPTION OF THE PREFERRED EMBODIMENT

Figure 1:
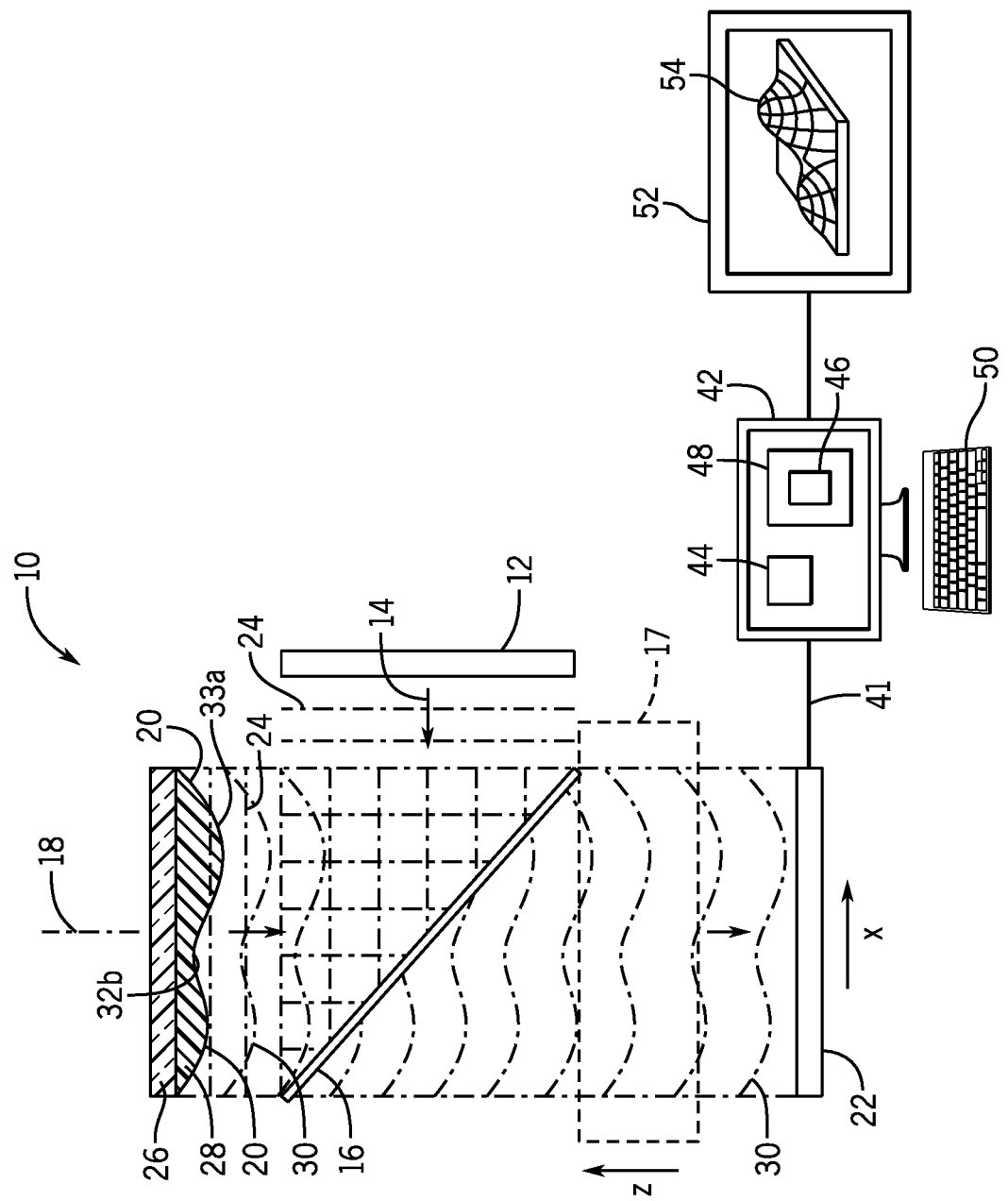
FIG. 1 is a simplified diagram of a first embodiment of the present invention providing an illumination source for illuminating a surface whose relief will be measured, the illuminated surface providing a wavefront to a phase sensitive detector, the latter communicating with a computer to provide a relief measurement output.

Referring now to FIG. 1, a surface relief measuring instrument 10, according to one embodiment of the invention, may provide a light source 12 projecting light 14 as indicated by an arrow toward a beam splitter 16. The beam splitter 16 lies in the path of a measurement axis between a surface 20 to be measured and a phase sensitive detector array 22. As positioned, the beam splitter 16 diverts the light 14 from the light source 12 along a measurement axis 18 toward the surface 20 to be measured. Light reflected from the surface 20 travels in the opposite direction again along the measurement axis 18 to pass through the beam splitter 16 and through an optional focusing optics 17 to be received by the phase sensitive detector array 22.

The phase sensitive detector array 22 provides wavefront angle data as will be discussed below to a computer 42 which processes that data to provide a displayable relief map 54 on a display 52. In this embodiment, the measurement axis 18 is aligned with an optical path between the surface 20 and the sensor array 22 and will be perpendicular to a front surface of the sensor array 22.

This light 14 from the light source 12 may be monochromatic in any of a variety of colors (visible or invisible to the human eye) or may be polychromatic, for example, including white light to aid in visual light imaging. In this regard, the light source 12 may incorporate different lamps, typically light emitting diodes (LEDs), allowing monochromatic and polychrome and light of different colors to be selected for different applications.

In this embodiment, light 14 from the light source 12 may provide a planar wavefront 24 which is redirected by 90° by the beam splitter 16 toward a surface 20 while remaining substantially planar. As is generally understood in the art, a wavefront of light is a surface where all points on the surface have a corresponding phase which defines the forward propagation of the light. A planar wavefront 24 is provided by using collimating optics collimated light from a point source or by using an array of LEDs or using a diffuser or other known techniques. The light need not be coherent light, for example, from a laser; however, the present invention does not preclude the use of laser illumination when provided over a broad area. Preferably, the light 14 may simultaneously illuminate the surface 20 as received on the imaging array 22.

The optional focusing optics 17 may provide, for example, reflective or refractive optics that may have an object plane focused on and substantially aligned with an average height of the surface 20 and generally perpendicular to the measurement axis 18 and an image plane or focal plane focused on and aligned with the surface of the array 22. Generally the focusing optics 17 will provide a magnification in the manner of a microscope or telescope to permit measurement of small surfaces 20 close to the instrument 10 or remote surfaces 20 remote from the sensor array 22. More generally the focusing optics 17 match a desired resolution of the image with the fixed resolution of the sensor array 22.

Generally the effect of the focusing optics 17 will to be to provide a known scale factor to the x- and y-axis dimensions of the wavefront 30, where the x- and y-axes are parallel to the surface of the sensor array 22 and perpendicular to the measurement axis 18, and to provide a known scale factor to the z-axis dimension of the wavefront 30 along measurement axis 18. The scale factors may be used to adjust a quantitative measurement of surface relief as will be discussed below.

The surface 20 being measured may be of arbitrary size and surface relief providing a portion fitting within the field of view of the sensor array 22. In one embodiment, the surface 20 may be of a material 28 supported on a planar substrate 26 generally perpendicular to the measurement axis 18 where the material is a surface coating having various thicknesses along the measurement axis 18. In this case, relief measurement would establish the uniformity of the surface 20 of the material 28 or could measure erosion or wear of the material 28 of the surface 20. Material 28 need not be supported on a substrate 26, for example, in applications where surface relief of a structural material 28 is used to determine surface roughness or the like. The term "relief" generally indicates a height of the surface 20 with respect to an arbitrary reference plane perpendicular to the measurement axis 18 and thus along the z-axis.

Referring still to FIG. 1, in the embodiment of FIG. 1, the material 28 may be opaque but must have a reflective surface 20. Through the reflective qualities of the surface 20, when the planar wavefront 24 from the light source 12 strikes the surface 20, the reflected wavefront 30 will assume a shape corresponding to the relief of the surface 20 at multiple points. For example, portions 33*a* of the surface 20 that have the greatest relief or height along the measurement axis 18 will advance those portions of the wavefront 30 toward the sensor array 22 while portions 33*b* of the surface 20 having the least relief will retard those portions of the wavefront 30 away from the surface 20. The result is that a wavefront 30 arriving at sensor array 22 models the surface 20 and can be used to measure the relief of the surface 20.

The sensor array 22 receiving the wavefront 30 generates wavefront angle information 41 allowing discrete angle measurements of different portions of the wavefront 30 received by sensor elements of the sensor array 22, the sensor elements distributed in a rectilinear grid on the sensor array 22. The wavefront angle information 41 is provided to the computer 42 for processing as will be discussed below to reconstruct the wavefront 30.

The computer 42 may be a general purpose "desktop" computer having one or more processors 44 executing a program 46 stored in a computer memory 48 providing non-transitory storage. The computer 42 may provide for one or more user input devices 50 such as a keyboard or the like for control of the imaging process and may communicate with a display 52 for the display of a relief map 54. Alternatively, the computer 42 may provide for specialized hardware for high-speed processing of imaging data, for example, custom field programmable gate arrays and the like.

Figure 2:
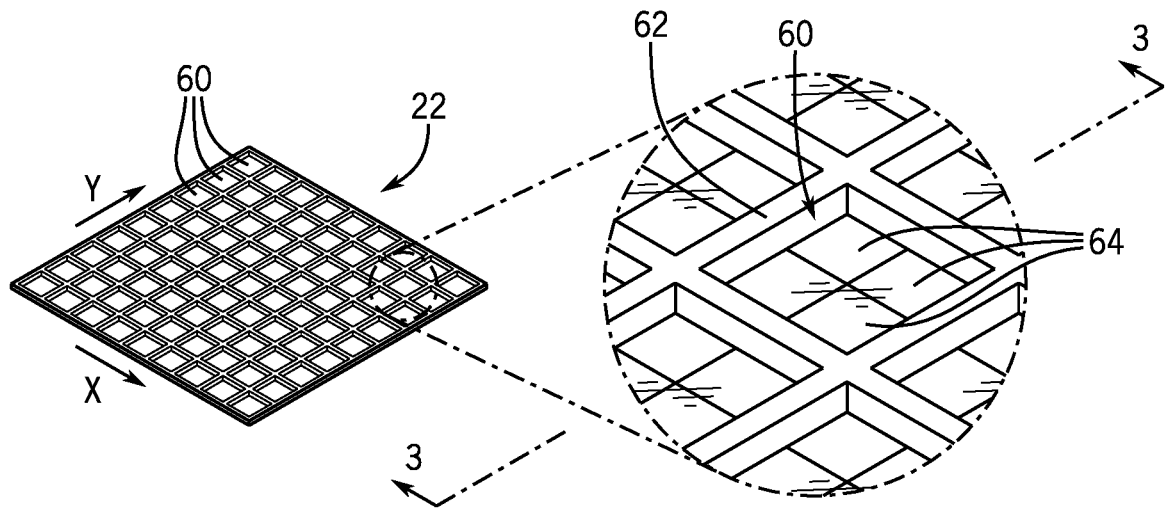
FIG. 2 is a perspective view of the phase sensitive detector of FIG. 1 showing a two-dimensional array of sensor elements and showing in an inset an enlarged view of the sensor elements depicting a set of shadow casters positioned over light-sensitive pixels for deducing the phase angle of the received light at the sensor element.

Referring now to FIG. 2, the sensor array 22 in one embodiment may provide a generally rectangular area for receiving light, this area having sensor elements 60 distributed over its surface in rows and columns corresponding generally to the x- and y-axes directions. In one embodiment the number of sensor elements may be over 20,000 and may have a center-to-center separation along a row or column of less than 20 μm.

Each sensor element 60 may provide multiple light-sensitive pixels 64, four in this example but at least three, distributed in two dimensions. The pixels 64 are surrounded by an opaque mask 62, for example, a metallization layer extending upward from the surface of the pixels 64 exposing within the mask 62 an opening allowing light to reach the pixels 64. The mask 62 provides a shadow caster shadowing certain of the pixels 64 depending on the direction of light propagation which in turn is related to wavefront angle. The angle of received wavefronts changes the length and position of the shadows which may be measured by analyzing modification of the intensities of light received at the different light-sensitive pixels 64.

Figure 3:
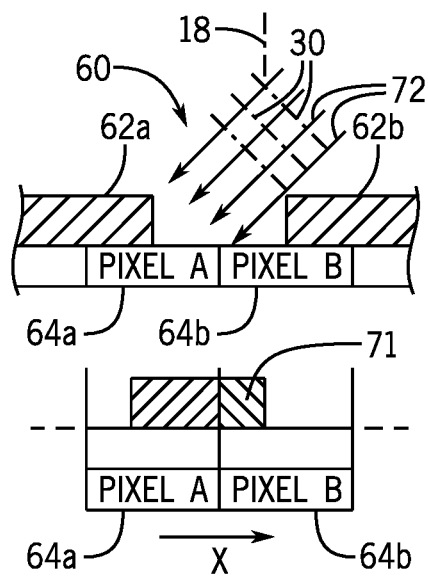
FIG. 3 is a cross-section along line 3-3 of the inset of FIG. 2 showing the operation of the shadow casters to change the intensity of light received by adjacent pixels to provide proportionally different signals that can be used to deduce wavefront angle.

Referring now to FIG. 3, in one example, light received with a wavefront 30 angled with respect to the measurement axis 18 to be tipped toward mask 62*b* at the edge of pixels 64*b* will cast a shadow over a portion of the exposed light-sensitive area of a pixel 64*b* reducing the average intensity on pixel 64*b* being an integration of surface intensity 71. In contrast, substantially the entire exposed area of pixel 64*a* will be illuminated to provide a much higher average intensity. The greater average intensity of pixel 64*a* versus pixel 64*b* (intensity 71 integrated over the area of the pixel 64) will thus be a function of the angle of propagation 72 of the wavefronts 30.

This extraction of angles from the intensity 71 may be performed by the computer 42 executing the program 46 and may, for example, be done by applying a normalized set of average intensity values for each of the four pixels 64 to a lookup table to provide a polar and azimuthal angle for each sensor element 60 (or other equivalent two-dimensional angle measurement). Values in the lookup table may be established analytically or generated by a calibration process in which measurements of average intensities over pixels 64 are taken with known angles of light. Normally this process will be performed with a specific light source 12 and therefore a set of calibrations can be created for use with a variety of different light sources 12 of different frequencies and polychrome versus a monochromatic output.

It will be also appreciated that an overall intensity signal may be extracted from each sensor element 60, for example, by combining the intensity signals from each pixel and scaling it by an empirically derived value based on the angle of propagation 72 to accommodate the shadowing.

The sensor design FIG. 2 may be adapted to work with conventional CMOS pixel arrays through the addition of the masks 62 by a final metallization layer, and sensor array 22 thus may have extremely high spatial resolution and relatively low cost driven by the market for high performance CMOS cameras. It will be appreciated, however, that other imaging sensitive techniques may be used such as CCD imagers and the mask 62 may take on a variety of configurations, for example, as taught by U.S. patent application Ser. No. 15/975,435 filed May 9, 2018, entitled "Wavefront Detector" and hereby incorporated by reference.

Figure 5:
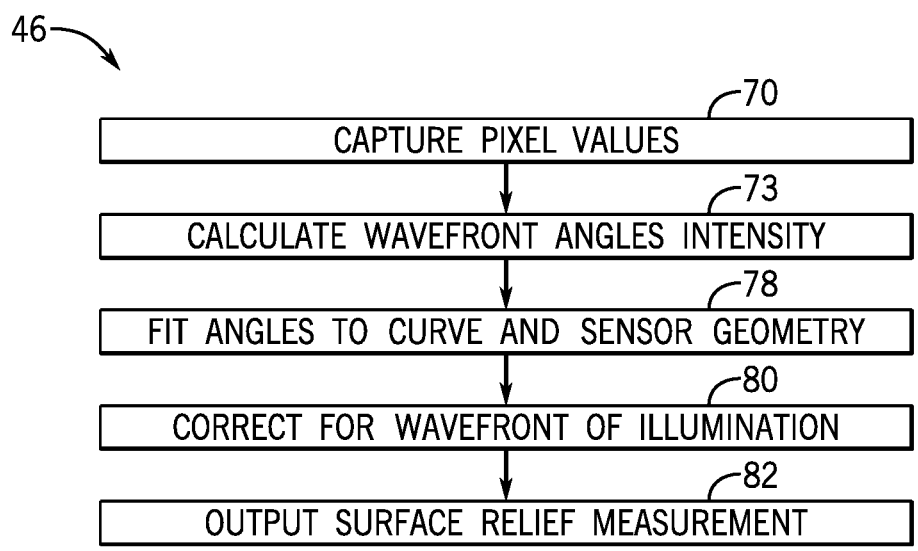
FIG. 5 is a flowchart executed by the computer of FIG. 1 in implementing the curve fitting process of FIG. 4.

Referring now to FIGS. 1, 2 and 5, under the control of the program 46 of computer 42, the instrument 10 may receive wavefront angle information 41 typically in the form of raw intensity values from each pixel 64 per process block 70. This raw intensity information may then be used to determine local wavefront angle and intensity for each sensor element 60 per process block 70 using calibration values and lookup tables as discussed above or by analytical means.

Figure 4:
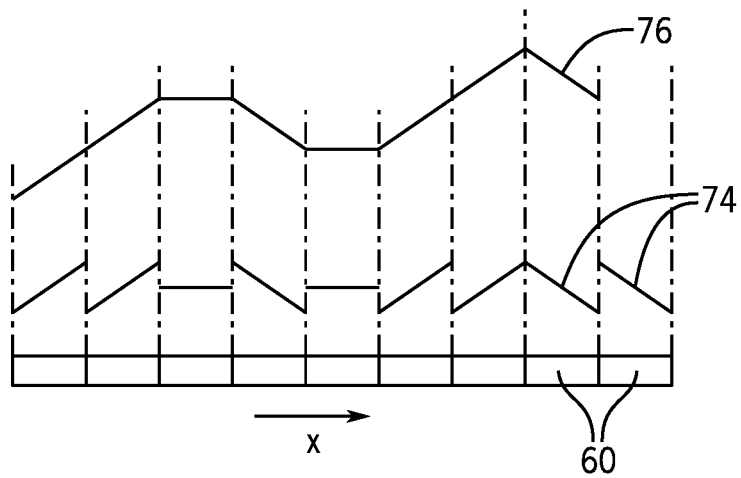
FIG. 4 is a diagrammatic representation of the conversion of wavefront angles measured by different sensor elements into a continuous wavefront curve through a piecewise curve fitting process.

Referring now to FIG. 4, the data from each sensor element 60 provides only a wavefront angle and accordingly these angle measurements must be fit together into a synthesized wavefront surface 76 matching wavefront 30. This fitting process finds a continuous curve having piecewise the angles indicated by the different sensor elements 60 over the two dimensions of measurements and may be done, for example, by a least square method. In this fitting process, the synthesized wavefront surface may be constrained, for example, to a given order of polynomial to enforce a degree of smoothness as selected by the user. Note that the absolute synthesized wavefront surface 76 will be a function both of the angle measurements 74 and the geometric spacing and location of the sensor elements 60, the latter of which are known and programmed into the program 40. This process of generating the synthesized wavefront surface 76 is indicated by process block 78 of FIG. 5.

After the synthesized wavefront surface 76 is formed, the program 40 may correct the synthesized wavefront surface 76 for aberrations in the wavefront of the illumination from light source 12 as indicated by process block 80. For example, this aberration may include deviations in wavefront 24 from light source 12 from a planar (for example, to accommodate a spherical wavefront from a point source) or a misalignment of a planar wavefront 24 in which the light 14 strikes the surface 20 at a nonzero angle with respect to measurement axis 18. This correction process may analytically determine the resulting wavefront 24 as reflecting from the surface 20 and perform a point-by-point subtraction of this resulting wavefront 24 from the synthesized wavefront surface 76. Alternatively, it will be appreciated that a correction factor may be an empirically determined by measuring known surfaces 20 and providing a correction table.

Referring again to FIG. 5, a final step of the program 40 indicated by process block 82 may output a surface relief map 54 based on the synthesized wavefront surface 76 and/or the surface normals of the synthesized wavefront surface 76 at each location of a sensor element 60, for example, captured in terms of the polar angle and azimuthal angle of that surface normal with respect to a parallel line through the center of the measurement region of each sensor element 60 parallel to the measurement axis 18. It will be appreciated from the above description that in this embodiment, generating a surface relief map 54 will require that the synthesized wavefront surface 76 be inverted and rotated about the measurement axis 18 by 180° to accommodate the inherent inversion and rotation of the image process associated with FIG. 1.

The surface relief map 54 that is output by the instrument 10, in its simplest form, may provide for numeric height or relief values associated with particular locations on the surface 20 whose images are received by particular sensor elements 60. For example, the surface relief map 54 may be simply an array of numeric values. Preferably however, the surface relief map 54 provides an image, for example, as shown in FIG. 1, providing a visual representation of relief heights and having markings and legends providing a quantitative indication of surface relief measured along measurement axis 18 at multiple points over the surface 20 to be measured.

Figure 6:
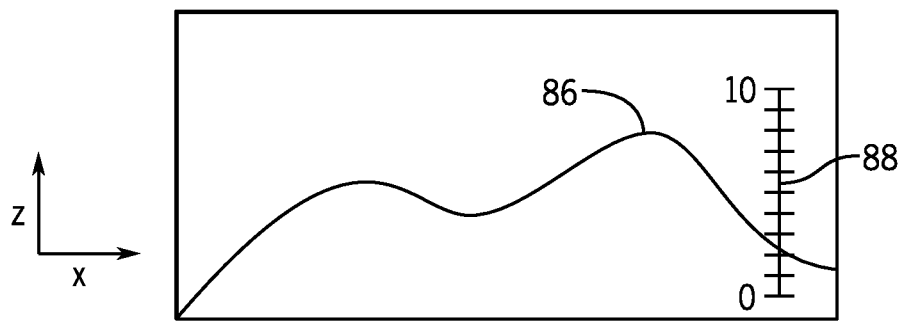
FIGS. 6-7 are depictions of various screen displays produced by the computer FIG. 1 and the display of FIG. 4 depicting quantitative surface relief.

Referring to FIG. 6, in one form, this relief map 54 may provide a simple two-dimensional plot 86 indicating a dimension along the surface 20 on one plot axis (for example, the x-axis) and a height of the surface 20 on the other plot axis providing height of the surface 20 at various points along one cross-section through the surface 20 in the x-y plane at a particular y value. It will be appreciated that multiple such plots 86 may be provided for multiple planes displaced along the y-axis and superimposed for three-dimensional effect. A side scale 88 allows points on the curve 66 to be associated with numeric values which may be extracted from the synthesized wavefront surface 76 modified with scaling factors that may be necessary for a focusing optics 17 as discussed above.

Figure 7:
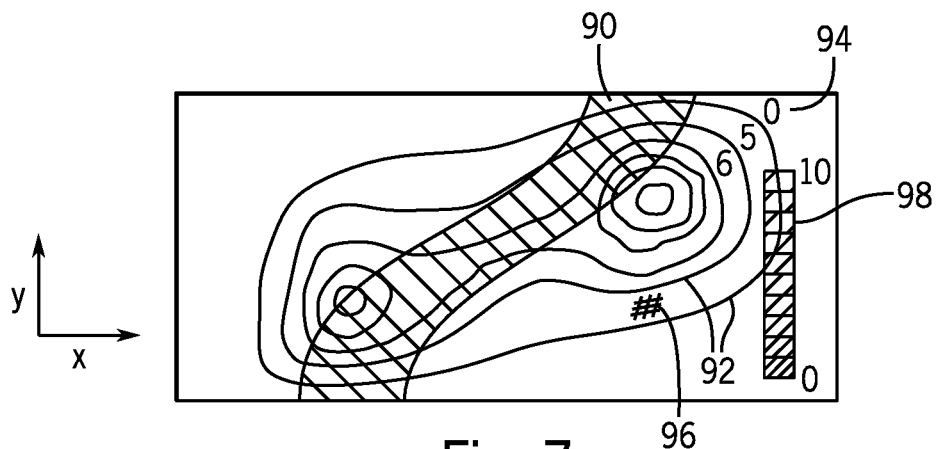
Figure 8:
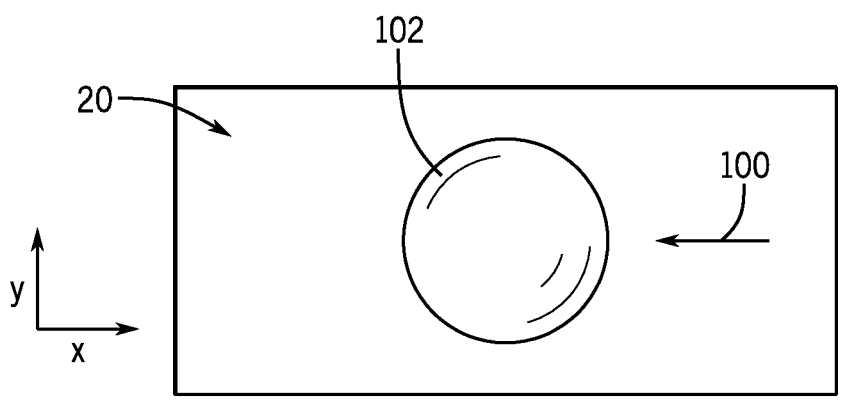
FIG. 8 is a figure depicting polar and azimuthal shading of the displayed surface to provide a qualitative surface relief understanding combined with the quantitative measurement.

As shown in FIG. 7, an alternative display provides a planar image of the surface 20 in the x-y plane. This depiction can also show intensity values, in this example, showing a darkened swath 90 representing regions of low reflection and may provide for quantitative relief indications, for example, by contour lines 92 associated with numeric legends 94 or by colors 96 associated with a numeric color legend 98.

These relief maps 54 may be augmented by or alternatively may provide for false shadow depictions of the surface 20 to provide a more intuitive understanding of the surface shape and can be helpful because ideally the surface 20 is illuminated at an angle that removes shading clues. Such false shading may provide, for example, for polar angle shading where a polar angle extracted at process block 80 of FIG. 5 is compared to an arbitrary hypothetical illumination direction 100 and a shading is created by comparing surface normals of the synthesized wavefront surface 76 (as appropriately inverted or rotated) to the illumination direction 100 so that surface normals opposite and parallel to the illumination direction 100 associated with brightest shading and surface normals parallel to and aligned with the illumination direction 100 are given the darkest shading. This creates a shadowing effect on slopes of the surface 102 away from the oncoming light to provide an intuitive understanding to a surface.

Alternatively or in addition, a false shading may be based on azimuthal angle which will provide the brightest shading in the image where the surface normal has an azimuthal angle facing upward out of the image and darkest shading when the azimuthal angle is parallel to the plane of the image. This shading represents shading that would be seen with volumetric nondirectional illumination.

Figure 9:
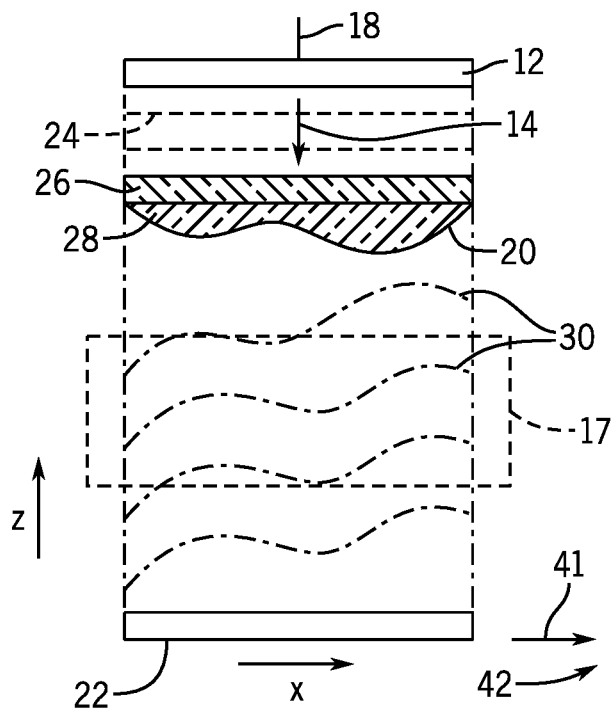
FIG. 9 is a figure similar to that of FIG. 1 showing an alternative design for a transmission optical system rather than an optical system based on reflection.

Referring now to FIG. 9, the present invention may also operate in a transmission rather than reflection mode in which light source 12 is positioned on a rear side of a transparent substrate 26 holding a transparent material 28 to be measured, the transparent material providing the surface 20 on substrate 26 facing away from the light source 12. Light 14 from the light source 12 having wavefronts 24, as discussed above, may now pass through the substrate 26 and material 28 to create a wavefront 30 indicating a height of the material 28 along measurement axis 18. The capturing of height by the wavefront 30 is possible in cases where the index of refraction of the material 28 is homogenous and an amount of phase delay in the wavefront 30 per linear distance can be captured as a scaling factor to be accommodated by the program 46. Generally, thicker sections of the material 28 will provide a greater retardation to the wavefront 30 proportional to height of the material 28.

The wavefronts 30 may be received by a focusing optics 17 as discussed above and then by sensor array 22, and again wave wavefront angle information 41 may be sent to the computer 42 for analysis. In this case inversion of the synthesized wavefront surface 76 need not be performed because of the different optics; however, rotation by 180° may be performed depending on the focusing optics 17. It will be appreciated in this transmissive mode, that alternatively the substrate 26 may be placed directly on top of the sensor array 22 with the material 28 facing the light source 12 to provide for "contact" photography without a focusing optics.

Figure 10:
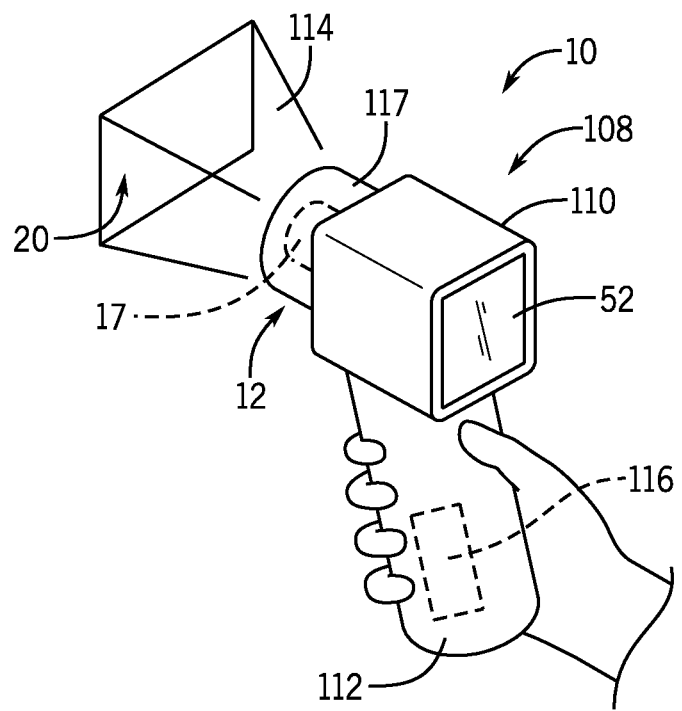
FIG. 10 is a perspective view of a hand-held instrument implementing the present invention.

Referring now FIG. 10, the present invention provides the potential for a handheld surface relief measurement system 108 possible both because of the potentially high measurement rates obtained by parallel measurement of surface height over multiple points of the surface (which negates the effect of small amounts of motion) and by the lack of mechanical fixation necessary for interferometry measurements where separation distances between the measurement system and the surface must be precisely controlled and incremented.

Such a handheld surface relief measurement system 108 may provide a housing 110 having a handle 112 that can be grasped so that the instrument 10 may be fully supported by a user. A rear surface of the housing 110 may provide for display 52 and the housing may contain the computer 42 and sensor array 22. A focusing optic 17 may be placed concentrically within a ring illuminator 117 providing a substantial planar wave illumination 114 (without the need for a beam splitter) directed toward the surface 20. Complete portability may be provided through the use of a battery power supply 116 contained within the handle 112 or elsewhere within the housing 110. Rapid successive measurements may be made and displayed on display 52 and may be collected to provide storage video records in cases where evolution of the surface 20 should need to be documented or measured.

Generally will be appreciated in the embodiment of FIG. 1, 2 or, 10, that light from the illumination source need not strike the surface to be measured perpendicular to the extent of that surface but may be angled so as to avoid the need for a beam splitter 16, this angulation being extractable from the wavefront measured by a simple mathematical process as discussed above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Quantitative means and output that provides a repeatable numeric value with a definable precision relating to an objective parameter of the surface to be measured and may be output either by the direct application of numbers to portions of the image, or through a numbered key, for example, relating display colors to numbers and other well-known methods of displaying numeric values.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "an electronic computer" and "a processor" or "the microprocessor" and "the processor," can be understood to include one or more of these devices that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An apparatus for surface relief measurement comprising:
a light source for illuminating a surface to be measured along an illumination axis;
a wavefront angle sensor comprising an array of sensor elements at multiple locations distributed in two dimensions over a sensor area, each sensor element adapted to measure a wavefront angle of a wavefront received at the sensor element with respect to an axis of the wavefront angle sensor, the wavefront angle sensor positioned to receive light from the light source phase shifted by the surface to be measured to alter the wavefront angle of the wavefront received by the sensor; and an electronic computer providing a display and a processor executing a program stored in non-transitive media to:

(a) collect wavefront angles from the sensor elements to compute a continuous surface consistent with the wavefront angles; and (b) output a relief map of the surface to be measured using the continuous surface, the relief map indicating heights of the surface to be measured along the illumination axis at multiple points distributed in two dimensions over the surface to be measured;

wherein the wavefront angle sensor further provides:

an array of light intensity sensing elements tiling the surface area to receive light having a wavefront angle with respect to a surface normal of the array;

a set of shadow-casters, each shadow-caster associated with a group of at least three sensing elements to selectively shade different sensing elements of that group as a function of the wavefront angle; and wherein the electronic computer operates to determine light intensity measured by different sensing elements in a group to provide an output signal indicating wavefront angle; and wherein the sensor elements are distributed over two dimensions of the sensor area at a spacing of less than 20 μm and there are over 20,000 sensor elements.

2. The apparatus of claim 1 wherein the relief map is selected from the group consisting of: a set of cross-sectional plots together describing a three-dimensional surface, two-dimensional representation of a shaded three-dimensional surface, planar diagram with iso-elevation lines, and an array of height values.

3. The apparatus of claim 1 wherein the relief map provides a quantitative indication of surface heights.

4. The apparatus of claim 1 wherein the wavefront angle sensor further measures wavefront intensity at each sensor element and wherein the relief map provides an indication of light intensity at the multiple points by combining the intensity signals from the group of at least three sensing elements and scaling it by a value based on a wavefront angle deduced from the group of at least three sensing elements.

5. The apparatus of claim 1 wherein the electronic computer may further execute the program to determine an azimuthal angle with respect to the illumination axis at multiple points on the surface to be measured and wherein the relief map provides a shading synthesizing a shading of the surface as if illuminated from a particular azimuthal angle direction.

6. The apparatus of claim 1 wherein the electronic computer may further execute the program to determine a polar angle with respect to the illumination axis at multiple points on the surface to be measured and wherein the relief map provides a shading synthesizing a shading of the surface as if illuminated from a diffuse light source.

7. The apparatus of claim 1 wherein the electronic computer corrects the relief map according to a known shape of a wavefront of the light source by subtracting or adding the known shape of the wavefront of light from or to the continuous surface.

8. The apparatus of claim 1 further including a focusing optics receiving light from the surface to be measured and wherein the wavefront angle sensor is positioned at a focal plane of the focusing optics.

9. The apparatus of claim 8 wherein the relief map provides a quantitative indication of surface heights at the multiple points and wherein the electronic computer corrects the relief map quantitative output according to a magnification of the focusing optics.

10. The apparatus of claim 1 wherein the array of light sensing elements are CMOS light detectors.

11. The apparatus of claim 1 wherein the array of light sensing elements are CCD light detectors.

12. The apparatus of claim 1 wherein the light source is polychromatic light.

13. The apparatus of claim 1 wherein the light source is at least one light-emitting diode.

14. The apparatus of claim 1 wherein the continuous surface is formed by a curve fitting process fitting the wavefront angles to a continuous surface.

15. The apparatus of claim 1 wherein the light source is positioned on a first side of the surface to be measured and transmits light to the first side of the surface to be measured which is reflected from the surface to be measured to the wavefront angle sensor and wherein the electronic computer inverts the continuous surface to provide the relief map.

16. The apparatus of claim 1 wherein the light source is positioned on a first side of the surface to be measured and transmits light to the first side of the surface to pass through the first side of the surface and out of a second side of the surface opposite the first side to be measured.

17. The apparatus of claim 1 wherein the apparatus provides a housing for supporting the light source and the wavefront angle detector and the display, the housing providing a handle for full support of the housing by a user relative to the surface to be measured to be positionable by the user by observing an image on the display.

18. The method of claim 17 including repeating (b) at a frame rate to produce a video relief map showing evolution of the surface to be measured over time.

19. The apparatus of claim 1 wherein the computed continuous surface is dependent on the wavefront angles.

20. A method of measuring surface relief of a surface to be measured using a camera system having:

a light source for illuminating a surface to be measured along an illumination axis;

a wavefront angle sensor comprising an array of sensor elements at multiple locations distributed in two dimensions over a sensor area, each sensor element adapted to measure a wavefront angle of a wavefront received at the sensor element with respect to an axis of the wavefront angle sensor, the wavefront angle sensor positioned to receive light from the light source phase shifted by the surface to be measured wherein the wavefront angle sensor further provides an array of light intensity sensing elements tiling the surface area to receive light having a wavefront angle with respect to a surface normal of the array and a set of shadow-casters, each shadow-caster associated with a group of at least three sensing elements to selectively shade different sensing elements of that group as a function of the wavefront angle; and wherein the electronic computer operates to determine light intensity measured by different sensing elements in a group to provide an output signal indicating wavefront angle and wherein the sensor elements are distributed over two dimensions of the sensor area at a spacing of less than 20 μm and there are over 20,000 sensor elements; and an electronic computer providing a display and a processor executing a program stored in non-transitive media, the method comprising:

(a) illuminating the surface to be measured with the light source;
(b) collecting wavefront angles from the sensor elements and using the computer to compute a continuous surface consistent with the wavefront angles; and
(c) outputting a relief map of the surface to be measured using the continuous surface, the relief map indicating heights of the surface to be measured along the illumination axis at multiple points distributed in two dimensions over the surface to be measured.

\* \* \* \* \*